UNITED STATES PATENT OFFICE.

CHARLES R. KLINGENSMITH, OF TARENTUM, PENNSYLVANIA.

PROCESS OF CURING KELP.

1,186,587. Specification of Letters Patent. Patented June 13, 1916.

No Drawing. Application filed June 18, 1914, Serial No. 845,980. Renewed March 31, 1916. Serial No. 88,171.

*To all whom it may concern:*

Be it known that I, CHARLES R. KLINGENSMITH, a citizen of the United States of America, residing at Tarentum, in the county of Allegheny and State of Pennsylvania, have invented certain new and useful Improvements in Processes of Curing Kelp, of which the following is a specification, reference being had therein to the accompanying drawing.

This invention relates to a process of curing kelp, and has for its object to provide a process in a manner as hereinafter set forth, for curing kelp for commercial usages.

Kelp is a marine plant and found in various places principally in the Pacific Ocean. There are many species of kelp but the bull kelp is the one that is the main source of supply for manufacturing purposes. Bull kelp when green is transparent and in substance is much similar to a melon and contains ninety per cent. water. The curing in accordance with this invention, of the kelp is carried out as follows:—The kelp is first dried until it is incrusted with a crystal-like formation resembling salt, and after reaching such state is immersed in fresh water where it is allowed to soak for about twelve hours after which it is taken out and dried. After being thoroughly dried, it is then immersed in an alkaline solution for twelve hours. Preferably the solution is fresh water and soda and the proportions are one pound of soda to fifty gallons of water. After being soaked for about twelve hours in the alkaline solution, the kelp is removed and thoroughly dried and cured for one week, after which it is again immersed in fresh water for twelve hours. The kelp is then removed from the fresh water bath and then partly dried and the complete drying is had by exposing the kelp to sulfur fumes. The kelp is then ready for the finishing step which consists of soaking in fresh water until soft, after which it is opened up and soaked in a solution of fresh water and glycerin (proportions half and half), and then removed from the solution of water and glycerin and hung up to dry after which it is ready for the market.

What I claim is:—

1. A process of curing kelp which consists in drying the kelp in a green state until it becomes incrusted with the crystal-like formation, then submitting the same to a fresh water bath, then removing from the bath and drying, then submitting the dried kelp to an alkaline bath, then removing and drying, then submitting the dried kelp to a water bath, then partially drying, then completing the drying operation by submitting the partially dried kelp to sulfur fumes, then softening the dried kelp, then opening up the kelp and submitting it to a bath of water and glycerin, and then removing and drying the kelp.

2. A process of curing kelp consisting in drying green kelp until it is incrusted with a crystal-like formation, then submitting the same to a water bath, and then drying, then submitting the same to an alkaline bath and then drying, then submitting the same to a water bath and drying by sulfur fumes, and then submitting the material to a bath of water and glycerin and then removing and drying.

3. A process of curing kelp consisting in drying the green kelp until it is incrusted with a crystal-like formation, then immersing the incrusted kelp in a fresh water bath, then successively drying the kelp, immersing it in a bath of fresh water and soda, drying it, immersing it in a fresh water bath, drying it, softening it, subjecting it to a solution of fresh water and glycerin and drying.

In testimony whereof I affix my signature in the presence of two witnesses.

CHARLES R. KLINGENSMITH.

Witnesses:
MAX H. SROLOVITZ,
MARIE H. ZBIERAJ.

Copies of this patent may be obtained for five cents each, by addressing the "Commissioner of Patents Washington, D. C."